United States Patent
Jung et al.

(10) Patent No.: US 11,139,760 B2
(45) Date of Patent: Oct. 5, 2021

(54) MOTOR DRIVE APPARATUS AND CONTROL METHOD THEREOF

(71) Applicant: LG Electronics Inc., Seoul (KR)

(72) Inventors: Hansu Jung, Seoul (KR); Dongwook Kim, Seoul (KR); Minho Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/767,934

(22) PCT Filed: Nov. 27, 2018

(86) PCT No.: PCT/KR2018/014706
§ 371 (c)(1),
(2) Date: May 28, 2020

(87) PCT Pub. No.: WO2019/107871
PCT Pub. Date: Jun. 6, 2019

(65) Prior Publication Data
US 2020/0343834 A1     Oct. 29, 2020

(30) Foreign Application Priority Data
Nov. 29, 2017  (KR) .................. 10-2017-0162205

(51) Int. Cl.
*H02P 27/06* (2006.01)
*H02P 3/22* (2006.01)
*H02P 21/18* (2016.01)
*H02P 3/18* (2006.01)
*H02M 7/537* (2006.01)

(52) U.S. Cl.
CPC .............. *H02P 3/18* (2013.01); *H02M 7/537* (2013.01); *H02P 21/18* (2016.02); *H02P 27/06* (2013.01)

(58) Field of Classification Search
CPC ............ H02P 27/06; H02P 3/22; H02P 21/18; H02M 7/537
See application file for complete search history.

(56) References Cited

U.S. PATENT DOCUMENTS

| 5,710,699 A * | 1/1998 | King ..................... B60L 50/51 363/132 |
| 10,666,045 B2 * | 5/2020 | Gemin ................... B60L 50/40 |

(Continued)

FOREIGN PATENT DOCUMENTS

| JP | 2008271612 | 11/2008 |
| JP | 2016010275 | 1/2016 |

(Continued)

*Primary Examiner* — Thai T Dinh
(74) *Attorney, Agent, or Firm* — Fish & Richardson P.C.

(57) ABSTRACT

A motor drive apparatus includes: a DC-side capacitor charged with direct current power; an inverter unit comprising multiple top switches and bottom switches, performing a switching operation so as to convert power stored in the DC-side capacitor into alternating current power, and outputting the converted alternating current power to a motor; a shunt resistor for detecting a current flowing through the DC-side capacitor; and a controller for controlling the inverter unit to perform dynamic braking for stopping the motor. Before the dynamic braking is performed, the controller controls the inverter unit to gradually increase a phase current flowing through the bottom switches.

20 Claims, 14 Drawing Sheets

(56) References Cited

U.S. PATENT DOCUMENTS 10,958,069 B2 * 3/2021 Gemin .................... B60L 50/30
2012/0245772 A1 * 9/2012 King ..................... B60W 10/08
                                                              701/22

FOREIGN PATENT DOCUMENTS

| KR | 101039452 | 6/2011 |
| KR | 20120134904 | 12/2012 |
| KR | 20170022202 | 3/2017 |

* cited by examiner

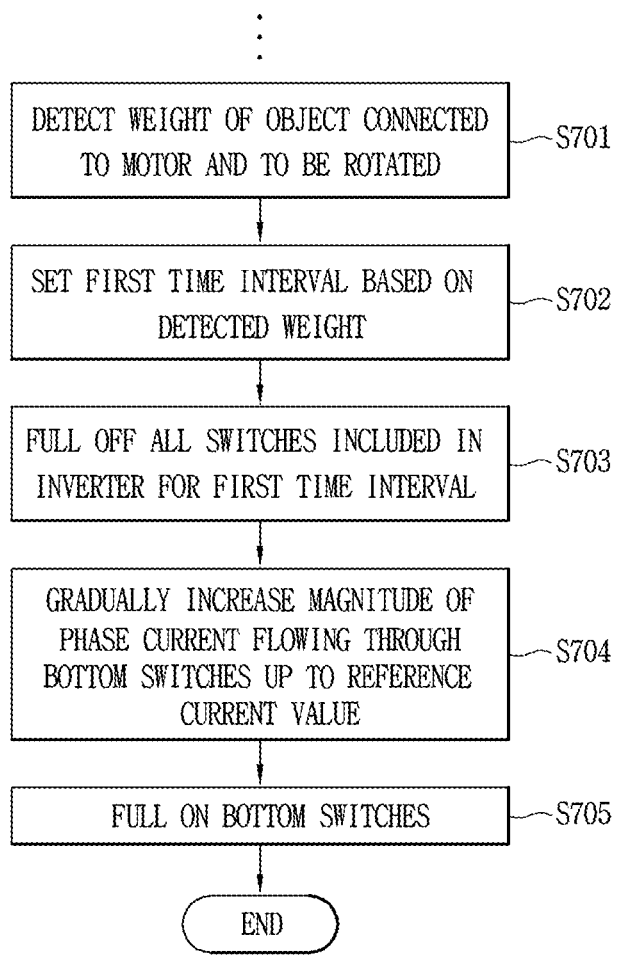

MOTOR DRIVE APPARATUS AND CONTROL METHOD THEREOF

CROSS-REFERENCE TO RELATED APPLICATIONS

This application is a National Stage application under 35 U.S.C. § 371 of International Application No. PCT/KR2018/014706, filed on Nov. 27, 2018, which claims the benefit of Korean Application No. 10-2017-0162205, filed on Nov. 29, 2017. The disclosures of the prior applications are incorporated by reference in their entirety.

TECHNICAL FIELD

The present disclosure relates to a motor drive apparatus to perform dynamic braking and a control method thereof, or a home appliance having a motor drive apparatus.

BACKGROUND ART

A motor drive apparatus is an apparatus to operate a motor having a rotor configured to perform a rotational motion and a stator wound with a coil.

The motor drive apparatus may be divided into a sensor type motor drive apparatus using a sensor and a sensorless type motor drive apparatus without a sensor.

Between the types of the above-described motor drive apparatus, a sensorless motor drive apparatus is frequently used for reasons of manufacturing cost reduction, and accordingly, a research on a sensorless motor drive apparatus has been conducted for efficient motor operation.

Meanwhile, various technical changes have been made in a washing machine due to a user's desire for quick strokes and improved performance.

In response to this, in addition to a pulsator type washing machine in which laundry is supplied from above, a drum type washing machine also has been released a lot. And in the pulsator type, a direct drive method directly driving a motor is now preferred more than a method indirectly receiving a rotational force of a motor through a belt, and rotation speed is also greatly increased to improve dehydration performance and to achieve rapid dehydration.

Recently, in order to reduce power consumption of a washing machine, a technique of transmitting a driving force of a motor to a pulsator or to a drum through a gear portion has been applied.

However, a washing machine equipped with a gear portion has a problem that noise is generated when braking is performed. Specifically, a rotating shaft of the motor of the washing machine equipped with the gear portion is coupled with a rotor bush, and a coupling member is provided between the rotor bush and the gear portion. For example, one surface of the rotor bush and one surface of the coupling member are engaged with each other.

Here, a predetermined gap is generated between the rotor bush and the coupling member or between the gear portion and the coupling member in order to improve rotation between the engaging components. The gap may result in generating a plurality of times of noise when a braking is performed on the motor due to collisions between the rotor bush and the coupling member or collisions between the coupling member and the gear portion.

In particular, as a gear ratio of the gear portion is increased to reduce power consumption of the washing machine, a difference between an inertia generated in the rotor bush and an inertia generated in the pulsator or the drum increases, and this may result in increasing a noise by collisions between the rotor bush and the coupling member or collisions between the coupling member and the gear portion.

That is, when collisions occur between the rotor bush and the coupling member or between the coupling member and the gear portion, noise that causes inconvenience to a user of the washing machine may be generated, and it may cause a failure of the components.

A washing machine is exemplified above in order to explain such a problem, but the above problems are commonly involved in an apparatus performing quick braking or dynamic braking on the motor.

DETAILED DESCRIPTION OF THE DISCLOSURE

Technical Problem

An aspect of the present disclosure is to provide a motor drive apparatus and a control method thereof to minimize noise that may be generated between components directly or indirectly connected to a motor when performing quick braking or dynamic braking on the motor.

Another aspect of the present disclosure is to provide a motor drive apparatus and a control method thereof to prevent components directly or indirectly connected to the motor from being damaged by dynamic braking of the motor.

Another aspect of the present disclosure is to provide a motor drive apparatus and a control method thereof to prevent noise between components directly or indirectly connected to the motor when dynamic braking is performed on the motor, while preventing overcurrent from flowing into a DC-side capacitor connected to an inverter.

That is, an aspect of the present disclosure is to provide a motor drive apparatus and a control method thereof to prevent noise generated by an apparatus having a motor, and at the same time, to promote a safety of an apparatus having a motor when dynamic braking is performed on the motor.

Technical Solution

To achieve these and other advantages and in accordance with the purpose of this specification, as embodied and broadly described herein, there is provided a motor drive apparatus according to the present disclosure including: a DC-side capacitor charged with direct current power; an inverter unit comprising multiple top switches and bottom switches, performing a switching operation so as to convert power stored in the DC-side capacitor into alternating current power, and outputting the converted alternating current power to a motor; a shunt resistor for detecting a current flowing through the DC-side capacitor; and a controller for controlling the inverter unit to perform dynamic braking for stopping the motor, wherein, before the dynamic braking is performed, the controller controls the inverter unit to gradually increase a phase current flowing through the bottom switches.

In one embodiment, the controller may control the inverter unit so that a duty ratio of the bottom switches increases from a minimum value up to a maximum value.

In one embodiment, the controller may control the inverter unit so that the duty ratio of the bottom switches increases linearly.

In one embodiment, the controller may control the inverter unit so that an increment in the duty ratio gradually decreases while gradually increasing the duty ratio of the bottom switches.

In one embodiment, the controller may control the inverter unit so that the phase current gradually increases during which the bottom switches are switched from full-off state into full-on state.

In one embodiment, when the control may turn off all the plurality of top switches and bottom switches for a first time interval, when a control command to perform dynamic braking is generated.

In one embodiment, the controller may control the inverter unit so that, when the first time interval has elapsed, a magnitude of the phase current flowing through the bottom switches gradually increases up to a reference value.

In one embodiment, the controller may control the inverter unit so that, when a second time interval has elapsed since when the duty ratio of the bottom switches started to gradually increase, dynamic braking is performed on the motor by maintaining the bottom switches in full-on state.

In one embodiment, the controller may control the inverter unit so that, when the magnitude of the phase current flowing through the bottom switches reaches a reference value, dynamic braking is performed on the motor by maintaining the bottom switches in full-on state.

In one embodiment, the controller may control the inverter unit so that, when a current value detected by the shunt resistor exceeds a limit current value, dynamic braking is performed on the motor by maintaining the bottom switches in full-on state.

In one embodiment, the controller may control the inverter unit so that, when a control command to perform dynamic braking is generated while a rotation speed of the motor is equal to or less than a reference speed value, the phase current flowing through the bottom switches is gradually increased before the dynamic braking is performed.

In one embodiment, the controller may control the inverter unit so that, when a control command to perform dynamic braking is generated while the rotation speed of the motor exceeds the reference speed value, the bottom switches included in the inverter unit are put into full-off state.

In one embodiment, the controller may set an initial duty ratio value of the bottom switches based on a rotation speed of the motor when a control command to perform the dynamic braking is generated.

In one embodiment, the controller may control the inverter unit so that a duty ratio of the bottom switches gradually increases from the set initial duty ratio value up to a reference duty ratio value, before dynamic braking is performed.

In one embodiment, the controller may control the inverter unit so that the duty ratio of the bottom switches increases by a predetermined increment in the duty ratio for every one cycle of the bottom switches from the set initial duty ratio value, before dynamic braking is performed.

In one embodiment, the controller may control the inverter unit so that the duty ratio of the bottom switches increases from the set initial duty ratio value, until the phase current of the bottom switches reaches a reference current value.

In one embodiment, the controller, before dynamic braking is performed, may control the inverter unit so that the duty ratio of the bottom switches gradually increases from the set initial duty ratio value for every one cycle of the bottom switches but the increment in the duty ratio is gradually reduced.

In one embodiment, the initial duty ratio value of the bottom switches may decrease as the rotation speed of the motor at a time when a control command to perform the dynamic braking is generated increases.

In one embodiment, the controller may detect information on a rotation speed of the motor at a time when a magnitude of a phase current flowing through the bottom switches started to gradually increase, and set the second time interval based on the information on the detected rotation speed.

In one embodiment, the motor drive apparatus further includes a sensor configured to detect weight of an object that is connected to the motor and to be rotated, wherein the controller may set the first time interval based on the weight detected by the sensor.

In one embodiment, as the weight detected by the sensor increases, the first time interval may be increased.

In one embodiment, the controller may control the inverter so that a time duration in which the bottom switches are maintained in ON state gradually increases for every one cycle of the bottom switches, before dynamic braking of the motor is performed.

In one embodiment, the controller may control the inverter unit so that an impulse of a predetermined magnitude or greater is not generated on the phase current of the bottom switches, before dynamic braking of the motor is performed.

In addition, a laundry treating apparatus having a motor drive apparatus according to an embodiment of the present disclosure may be provided with a motor to provide a driving force, a transmission system to change a torque generated by the motor, and a plurality of top switches and bottom switches, and may include an inverter unit to output alternating current power source to the motor by a switching operation, and a controller to control the inverter unit so that dynamic braking to stop the motor is performed, wherein the controller may control the inverter unit so that the phase current flowing through the bottom switches gradually increases before the dynamic braking is performed.

In one embodiment, the controller may control the inverter unit so that the phase current flowing through the bottom switches gradually increases to prevent collisions between components included in the transmission system when dynamic braking is performed on the motor.

In one embodiment, the transmission system may include a plurality of shafts, a gear portion disposed between a first shaft and a second shaft of the plurality of shafts, and a coupling installed to be movable between a motor and any one of the plurality of shafts.

In addition, a laundry treating apparatus having a motor drive apparatus according to an embodiment of the present disclosure may be provided with a pulsator, a tub, a first shaft portion connected to the pulsator, a motor to provide a driving force to the laundry treating apparatus, a bush provided in a rotor of the motor, a second shaft portion inserted into the bush, a third shaft portion connected to the tub of the laundry treating apparatus, a gear portion installed between the first shaft portion and the second shaft portion to change a torque generated by the motor, a coupling installed to be movable up and down between the rotor and the third shaft portion, and a plurality of top switches and bottom switches, and may include an inverter unit to transmit an alternating current power source to the motor by a switching operation, and a controller to control the inverter unit so that dynamic braking is performed to stop the motor and to control an operation of the laundry treating apparatus.

In particular, the motor drive apparatus according to the present disclosure may control the inverter unit to gradually increase the phase current flowing through the bottom switches, before the dynamic braking is performed.

In one embodiment, the controller may control the inverter unit to gradually increase the phase current flowing through the bottom switches before the dynamic braking is performed, so that collisions between the coupling and the bush are minimized when a control command to terminate a dehydration stroke of the laundry treating apparatus is generated.

Advantageous Effects

A motor drive apparatus according to the present disclosure can minimize a noise that may be generated between components directly or indirectly connected to a motor by gradually increasing a phase current of an inverter connected to the motor when performing dynamic braking on the motor.

In addition, the motor drive apparatus according to the present disclosure can minimize a collision force between components directly or indirectly connected to the motor by gradually increasing a duty ratio of the inverter when performing dynamic braking on the motor.

Further, according to the motor drive apparatus of the present disclosure, safety of an apparatus having a motor can be secured by limiting a magnitude of a current flowing in a DC-side capacitor connected to the inverter while minimizing noise that may be generated between components directly or indirectly connected to the motor, when dynamic braking of the motor is performed.

In addition, according to the motor drive apparatus of the present disclosure, a failure of the components directly or indirectly connected to the motor can be prevented by minimizing a collision force between the components directly or indirectly connected to the motor, when dynamic braking of the motor is performed.

In addition, according to the motor drive apparatus of the present disclosure, by gradually increasing a phase current of the inverter when dynamic braking of the motor is performed, generation of an impulse on the phase current can be prevented and a braking on the motor can be more stably performed.

BRIEF DESCRIPTION OF THE DRAWINGS

FIG. 7 is a flowchart illustrating a control method for a motor drive apparatus in accordance with another embodiment of the present disclosure.

MODES FOR CARRYING OUT PREFERRED EMBODIMENTS

Hereinafter, description will be given in detail of embodiments disclosed herein. Technical terms used in this specification are merely used for explaining specific embodiments, and should not be constructed to limit the scope of the technology disclosed herein. In addition, technical terms used in this specification should be interpreted as meanings generally understood by those skilled in the art in the field to which the technology disclosed in this specification belongs, unless otherwise defined in the specification, and it should not be interpreted as a comprehensive meaning or an excessively reduced meaning.

Figure 1:
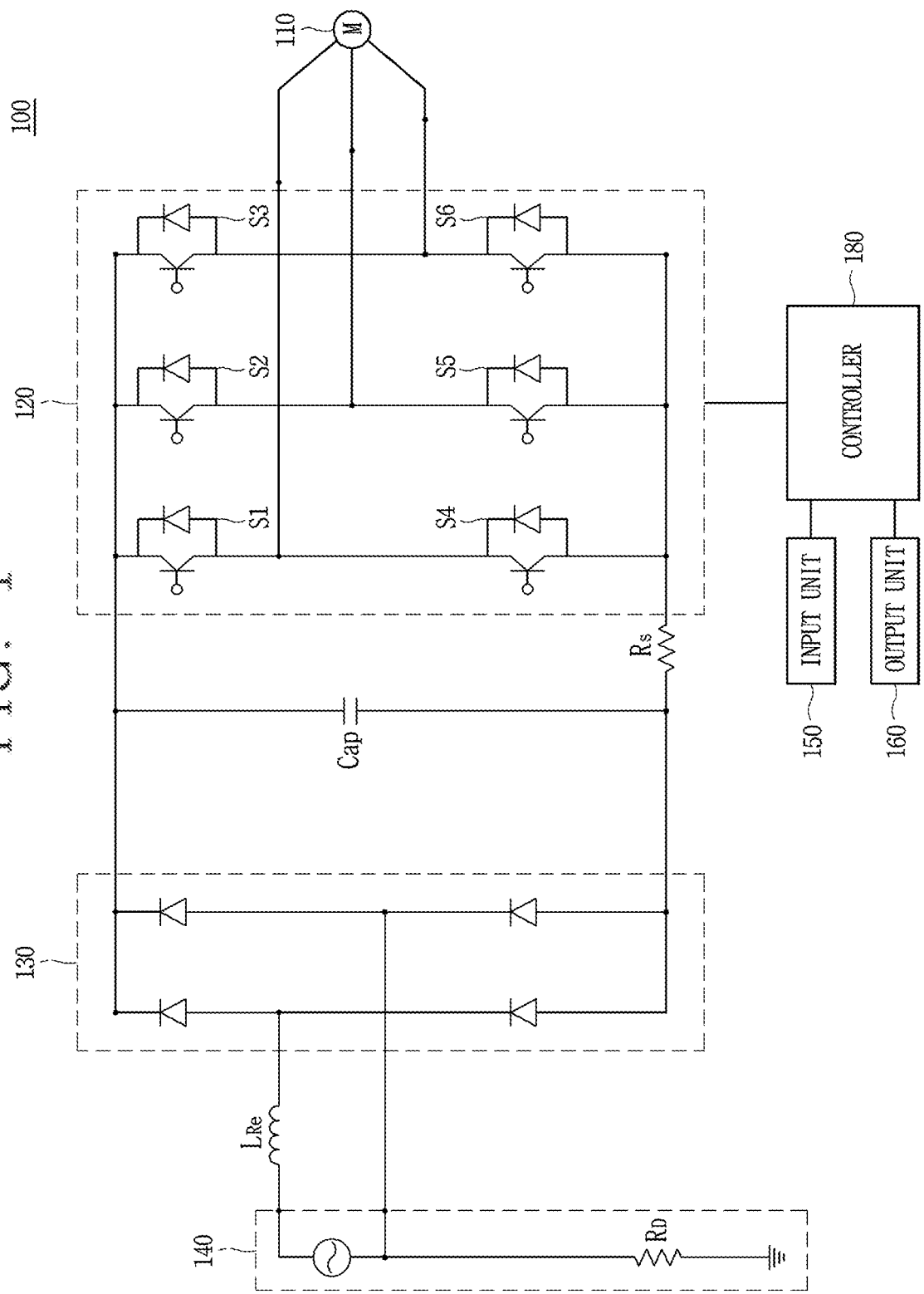
FIG. 1 is a circuit diagram of a motor drive apparatus according to the present disclosure.

Referring to FIG. 1, a motor drive apparatus 100 may include at least one of a motor unit 110, an inverter unit 120, a rectifying unit 130, an input power unit 140, an input unit 150, an output unit 160, and a controller 180.

Specifically, the motor unit 110 may be a motor to rotate a pulsator of a washing machine. Further, the motor unit 110 may be a motor to rotate a drum of the washing machine. For example, the motor unit 110 may be a three-phase motor.

Also, the rectifying unit 130 may receive input power from the input power unit 140 and rectify the received input power to convert it into a DC voltage. That is, a DC voltage of a predetermined level may be output from the rectifying unit 130.

As illustrated in FIG. 1, both ends of the rectifying unit 130 are connected to a DC-side capacitor (Cap), and the DC-side capacitor may smooth and store the DC voltage output from the rectifying unit 130. In one embodiment, the DC-side capacitor (Cap) may be a DC link capacitor.

The DC voltage smoothed by the DC link capacitor may be transmitted to the inverter unit 120.

The inverter unit 120 may include a plurality of switches. More specifically, when the motor unit 110 is a three-phase motor, the inverter unit 120 may include a pair of switches corresponding to each phase. That is, the inverter unit 120 may include first to sixth switches S1, S2, S3, S4, S5, and S6. For example, MOSFETs, insulated gate bipolar transistors (IGBTs), and the like are mainly used as switches.

Referring to FIG. 1, a collector of the first to third switches S1, S2, and S3 may be connected to one end of the DC link capacitor (Cap), and an emitter of the fourth to sixth switches S4, S5, and S6 may be connected to another end of the DC link capacitor.

Here, the plurality of switches included in the inverter may be classified into top switches and bottom switches according to installation positions. According to the classification, the first to third switches S1, S2, and S3 are defined as top switches, and the fourth to sixth switches S4, S5, and S6 are defined as bottom switches.

The inverter unit 120 may convert the DC voltage transmitted by the DC link capacitor into a three-phase AC power source and apply it to the motor unit 110. The inverter unit 120 is defined as a three-level inverter.

A shunt resistor Rs may be provided between the inverter unit 120 and the DC link capacitor. The shunt resistor is to detect a phase current of the motor unit 110.

A reactor Lre may be provided between the rectifying unit 130 and the input power unit 140. The reactor may be formed of an inductor, and when an input power is applied to the rectifying unit 130, the reactor stabilizes an impact on a transformer due to an inrush current that may be generated in the rectifying unit 130.

Meanwhile, the controller 180 outputs an inverter control signal to control the three-level inverter to the inverter unit 120. Here, the inverter control signal may be a pulse width modulation (PWM) control signal. The PWM control signal may include a control signal to adjust a duty ratio of the switch included in the inverter.

The duty ratio generally refers to an On-Duty Ratio, which is a ratio of a time duration in which a switch is on for a predetermined time interval.

That is, a maximum value of the duty ratio is 100%, and a minimum value of the duty ratio is 0%.

In addition, a state in which a switch's duty ratio is set to a maximum value is defined as a switch's full-on mode, and a state in which a switch's duty ratio is set to a minimum value is defined as a switch's full-off mode.

That is, a time maintained in ON state and a time maintained in OFF state for one cycle of the switch may be changed according to a duty ratio value of the switch set by the controller 180. Here, a state in which switches are maintained in ON state for one cycle of the switches is defined as a full-on state of switches, and a state in which switches are maintained in OFF state for one cycle of the switches is defined as a full-off off state of switches.

In addition, the controller 180 may further include a memory (not shown) that stores data to control an inverter control device.

The input unit 150 may receive a user input related to an operation of the motor unit 110 and an operation of the inverter unit 120. In addition, when a user input is applied, the input unit 150 may transmit a signal corresponding to the applied user input to the controller 180.

In addition, the output unit 160 receives a predetermined signal from the controller 180, and may operate based on the received signal. Specifically, the output unit 160 may include output elements such as light emitting diodes, LEDs, OLEDs, and buzzers.

Hereinafter, in FIG. 2, some of the components of the washing machine equipped with the gear portion will be described.

Figure 2:
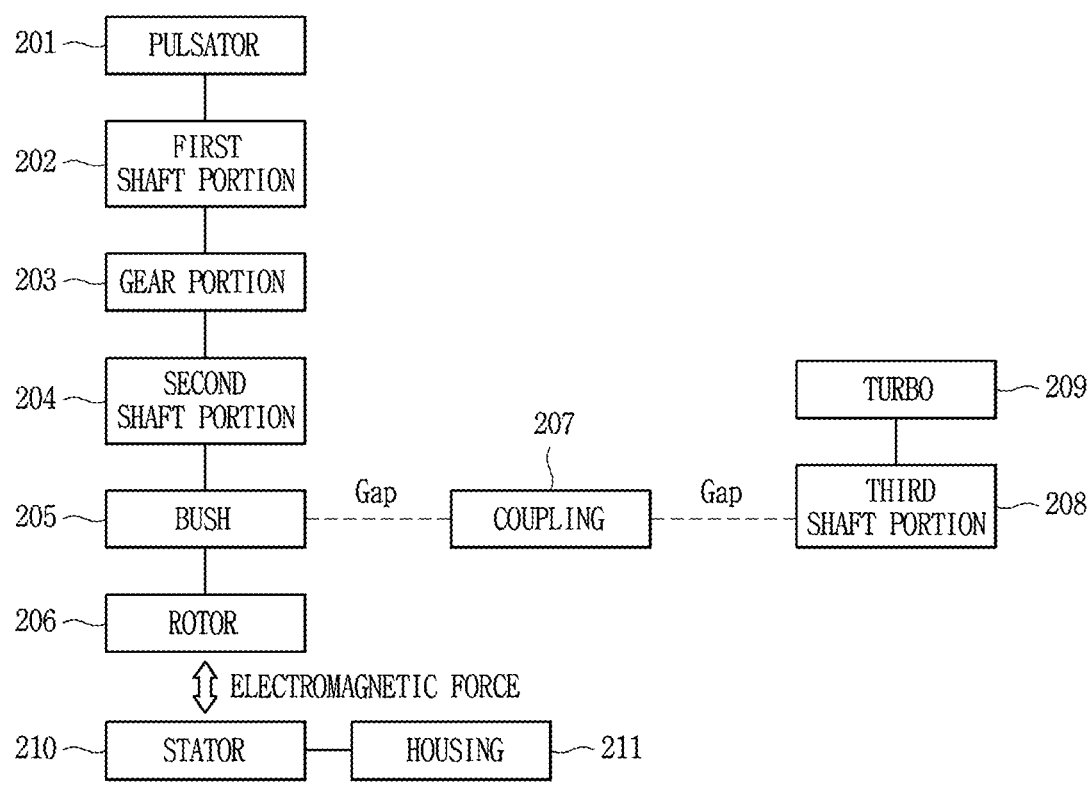
FIG. 2 is a block diagram illustrating components of a washing machine equipped with a gear portion.

For reference, a pulsator type washing machine is described as a reference in FIG. 2, but the present disclosure is not limited thereto, and may be applied to a drum type washing machine.

As illustrated in FIG. 2, a gear portion 203 may be disposed between a component provided in the motor and a pulsator 201.

Specifically, a first shaft portion 202 is connected to a central portion of the pulsator 201, and therefore the pulsator 201 and the first shaft portion 202 rotate together.

The motor unit 110 may include a rotor 206, a stator 210, and a housing 211. The rotor 206 may rotate by a magnetic field formed by the stator 210.

A bush 205 may be installed at a central portion of the rotor 206, and a second shaft portion 204 may be inserted into the bush 205. Therefore, the rotor 206, the bush 205 and the second shaft portion 204 rotate together.

In addition, the gear portion 203 is provided between the second shaft portion 204 and the first shaft portion 202. That is, the gear portion 203 may be connected to the first shaft portion 202 and the second shaft portion 204, respectively.

Here, the gear portion 203 may be installed to be engaged with a sawtooth portion (not shown) formed on inner surfaces of the first shaft portion 202 and the second shaft portion 204.

For reference, the first shaft portion 202 and the second shaft portion 204 are defined as a washing shaft.

The first shaft portion 202, the gear portion 203, and the second shaft portion 204 are rotatably installed inside a third shaft portion 208, and a tub 209 may be coupled to an upper end portion of the third shaft portion 208. A lower end portion of the third shaft portion 208 may be installed to be spaced apart from an upper surface of the bush 205 by a predetermined distance.

For reference, the third shaft portion 208 is defined as a dehydrating shaft.

In addition, a coupling 207 is disposed between the third shaft portion 208 and the bush 205. In one embodiment, the coupling 207 may be installed to be movable up and down. That is, the coupling 207 may allow only the first and second shaft portions to be rotated by being moved to an upper region to constrain the third shaft portion 208 or may allow the first to third shaft portions to be rotated simultaneously by being moved to a lower region to transmit a rotational force of the rotor 206 to the first to third shaft portions.

Figure 3:
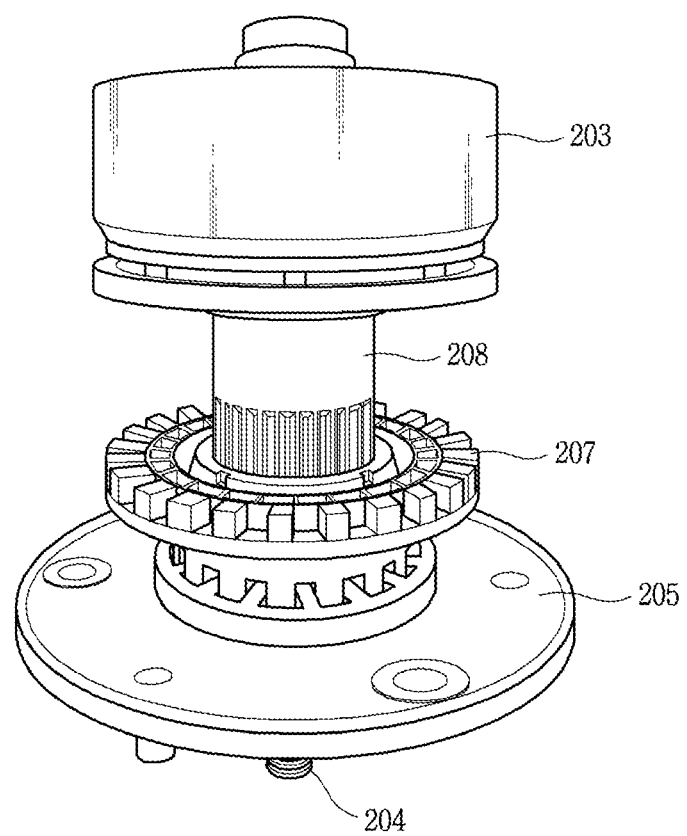
FIG. 3 is a conceptual view illustrating components connected to a gear portion.

In FIG. 3, components connected to the gear portion 203 are described.

Referring to FIG. 3, a gap of a predetermined distance may exist between the bush 205 and the coupling 207. The gap may result in generating a plurality of times of noise when a braking is performed on the motor due to collisions between the bush 205 and the coupling 207.

Specifically, due to torque fluctuations, a relative speed difference between the third shaft portion 208 and the second shaft portion 204 occurs, and the speed difference may change a contacted state between the coupling 207 and the bush 205 or between the coupling 207 and the third shaft portion 208.

That is, since an inertia of the first and second shaft portions included in the washing shaft is smaller than an inertia of the third shaft portion included in the dehydrating shaft by an application of the gear portion 203, collisions between the coupling 207 and the bush 205 occur, thereby generating a noise due to the collisions.

For reference, an embodiment in which components of the washing machine illustrated in FIGS. 2 and 3 operate according to strokes of the washing machine is as follows.

When a washing stroke starts after laundry and washing water are supplied to the tub, a magnetic field is generated in the stator as a power is applied to the stator 210, and the rotor 206 is rotated by the magnetic field of the stator 210.

The rotational force of the rotor 206 is transmitted to the bush 205, and the rotational force transmitted to the bush is transmitted to the second shaft portion 204. Here, since the coupling 207 is moved to an upper region and protrusions of the coupling are released from grooves formed in the bush 205, the rotational force of the rotor 206 is transmitted only to the second shaft portion 204.

An RPM of the second shaft portion 204 is reduced by a predetermined gear ratio in the gear portion 203, and the first shaft portion 202 and the pulsator 201 are rotated at a low speed of the reduced RPM to perform the washing stroke.

After the washing stroke is completed, a rinsing stroke is performed, and when the rinsing stroke is completed, a dehydration stroke is performed to minimize moisture contained in the laundry.

In the dehydration stroke, the coupling 207 is moved to a lower region, and accordingly, the protrusions of the coupling 207 are inserted into the grooves formed in the bush 205. That is, one surface of the coupling 207 and one surface of the bush 205 are engaged with each other.

Here, since the rotational force of the rotor 206 is transmitted to all the first to third shaft portions, the pulsator 201 connected to the first and second shaft portions and the tub 209 connected to the third shaft portion are simultaneously rotated at a high speed.

The laundry is washed through the washing stroke, the rinsing stroke, and the dehydration stroke. Recently, in some cases a drying stroke is added after the dehydration stroke.

In order to solve the above-mentioned problems, a control method of the motor drive apparatus according to the present disclosure is described below.

Figure 4:
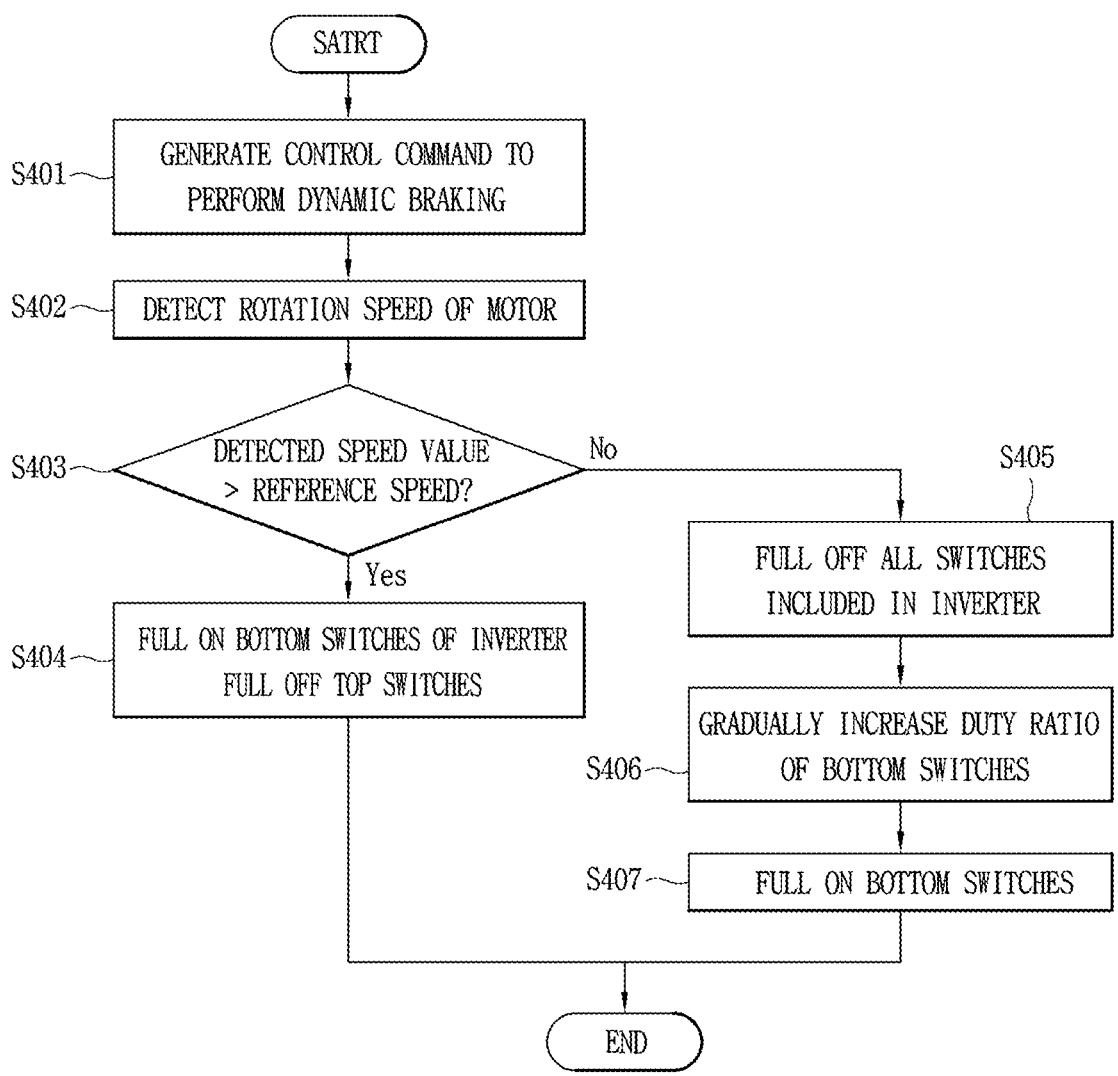
FIG. 4 is a flowchart illustrating a control method for a motor drive apparatus in accordance with one embodiment of the present disclosure.

Referring to FIG. 4, the controller 180 of the motor drive apparatus may generate a control command to perform dynamic braking on the motor [S401].

Specifically, when it is determined that any one of the washing, rinsing, and dehydrating strokes of the washing machine has ended in the washing machine provided with the motor drive apparatus, the controller 180 may generate a control command to perform dynamic braking.

In addition, the controller 180 may generate a control command to perform dynamic braking when a condition requiring a sudden stop of the washing machine is satisfied, such as a door of the washing machine being opened while the washing stroke, the rinsing stroke, and the dehydration stroke are performed.

When a control command to perform dynamic braking is generated, the controller 180 may detect a rotation speed of the motor [S402]. That is, the controller 180 may detect the rotation speed of the motor when a control command to perform dynamic braking is generated.

The controller 180 may compare the detected speed with a reference speed value [S403].

When the detected speed is greater than the reference speed value, the controller 180 may put all the bottom switches S4, S5, and S6 of the inverter unit 120 into full-on state and may put all the top switches S1, S2, and S3 into full-off state to perform dynamic braking [S404].

That is, in a case that the rotation speed of the motor at a time when a control command to perform dynamic braking is greater than the reference speed value, the controller 180 may immediately apply dynamic braking on the motor.

For example, the reference speed value may be 600 RPM.

In another example, the reference speed value may be changed according to a user's setting.

In another example, the controller 180 may set a reference speed value based on a washing condition. Here, the washing condition may include a condition related to at least one of a weight of clothes introduced into the tub, a weight of washing water introduced into the tub, a temperature in the tub, and a humidity in the tub.

In another example, the controller 180 may set a reference speed value based on information related to a capacity of the DC link capacitor (Cap).

Meanwhile, when the speed detected in the step of detecting rotation speed of the motor [S402] is smaller than the reference speed value, the controller 180 may put all the switches S1, S2, S3, S4, S5, and S6 included in the inverter unit 120 into full-off state to perform redundant braking [S405].

Specifically, the controller 180 may put all switches included in the inverter unit 120 into full-off state for a first time interval from a time when a control command to perform dynamic braking is generated.

For example, the first time interval may be set to 100 ms.

In another example, the first time interval may be changed according to a user's setting.

In another example, the controller 180 may set a first time interval based on a washing condition. An embodiment related to changing the first time interval is described in more detail in FIG. 7.

Thereafter, the controller 180 may gradually increase the duty ratio of the bottom switches S4, S5, and S6 of the inverter unit 120 [S406].

Specifically, the controller 180 may gradually increase the duty ratio of the bottom switches S4, S5, and S6 until the duty ratio reaches a reference duty ratio value.

That is, the controller 180 may increase the duty ratio each time one cycle of the bottom switches elapses. In this case, a time duration in which the bottom switches are maintained in ON state may be gradually increased for every one cycle of the bottom switches.

In other words, the controller 180 may control the inverter unit 120 to gradually increase the phase current flowing through the bottom switches, before dynamic braking is performed.

The controller 180 may control the inverter unit 120 so that the duty ratio of the bottom switches gradually increases during which the bottom switches are switched from full-off state into full-on state.

In one example, the controller 180 may gradually increase the duty ratio of the bottom switches S4, S5, and S6 from a minimum value up to a maximum value.

In another example, the controller 180 may linearly increase the duty ratio of the bottom switches S4, S5, and S6.

In another example, the controller 180 may nonlinearly increase the duty ratio of the bottom switches S4, S5, and S6.

In another example, the controller 180 may control the bottom switches so that the increment in the duty ratio of the bottom switches S4, S5, and S6 is gradually increased.

In another example, the controller 180 may control the bottom switches so that the increment in the duty ratio of the bottom switches S4, S5, and S6 is gradually decreased.

Meanwhile, the controller 180 may control the inverter unit 120 such that a magnitude of the phase current flowing through the bottom switches S4, S5, and S6 gradually increases up to a reference current value.

When the step of gradually increasing the duty ratio [S406] is completed, the controller 180 may put the bottom switches into full-on state [S407].

As described above, as the duty ratio of the bottom switches gradually increases, the duty ratio of the bottom switches eventually reaches the reference duty ratio value or a maximum duty ratio value. In addition, since the top switches have already been put into full-off state in the step of putting all the switches of the inverter unit 120 into full-off state [S405], dynamic braking of the motor is performed when the bottom switches are put into full-on state.

In one embodiment, while the duty ratio is gradually increasing, the controller 180 may monitor a phase current of the inverter unit 120, and when a magnitude of the phase current reaches a reference value, the controller 180 may perform dynamic braking on the motor unit 110 by putting the bottom switches S4, S5, and S6 into full-on state.

For reference, in the description of the present disclosure, putting the bottom switches S4, S5, and S6 of the inverter unit 120 into full-off state is defined as dynamic braking.

In addition, in the description of the present disclosure, putting all the top and bottom switches S1, S2, S3, S4, S5, and S6 of the inverter unit 120 into full-off state is defined as redundant braking.

In addition, in the description of the present disclosure, in switching the bottom switches S4, S5, and S6 of the inverter unit 120 from full-off state into full-on state, gradually increasing the duty ratio of the bottom switches is defined as intermediate braking.

Figure 5:
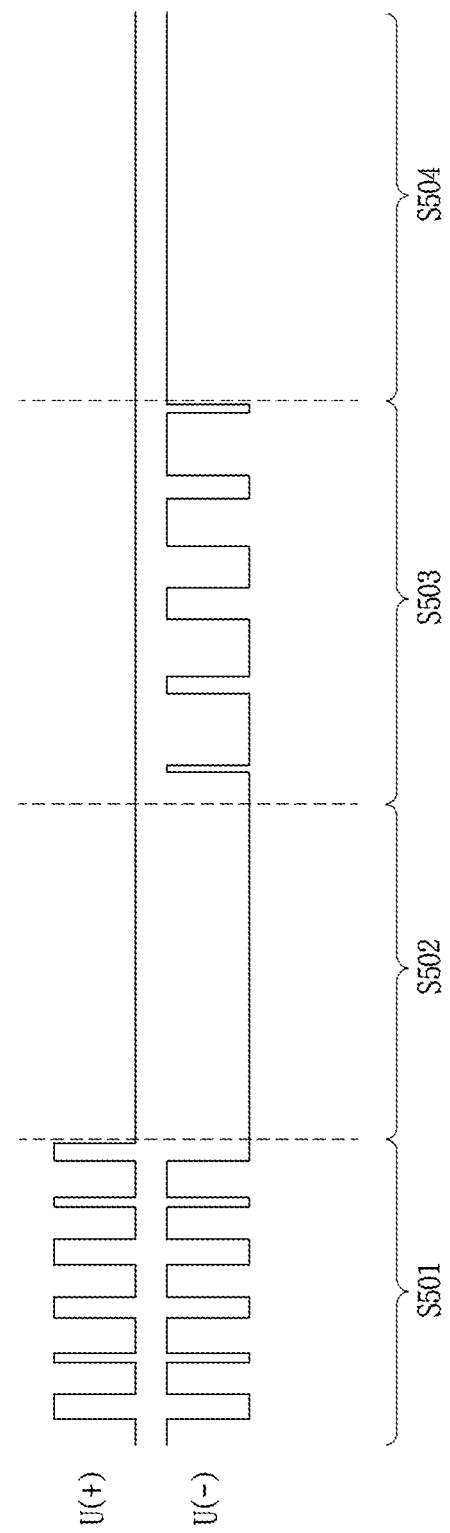
FIG. 5 is a graph showing an operating state of switches included in an inverter of a motor drive apparatus according to the present disclosure.

FIG. 5 illustrates changes in U-phase current of the inverter unit 120 when the controller 180 performs the braking methods described above. For reference, U (+) in FIG. 5 indicates a switch corresponding to a U-phase among the top switches S1, S2, and S3, and U (−) indicates a switch corresponding to a U-phase among the bottom switches S4, S5, and S6.

When a normal operation of an apparatus having a motor [S501] is terminated, the controller 180 may generate a control command to perform dynamic braking.

The controller 180 may put all the top and bottom switches into full-off state to perform redundant braking [S502] before entering dynamic braking.

When redundant braking is completed, the controller 180 may gradually increase the duty ratio of the bottom switches [S503].

Referring to FIG. 5, when the controller 180 gradually increases the duty ratio of the bottom switches, a time duration in which the switches are maintained in turned-on state may increase each time one cycle of the switches elapses.

When the step of gradually increasing the duty ratio [S503] is completed, the controller 180 may maintain the top switches in full-off state and put the bottom switches into full-on state in order to perform dynamic braking [S503].

Figure 6A:
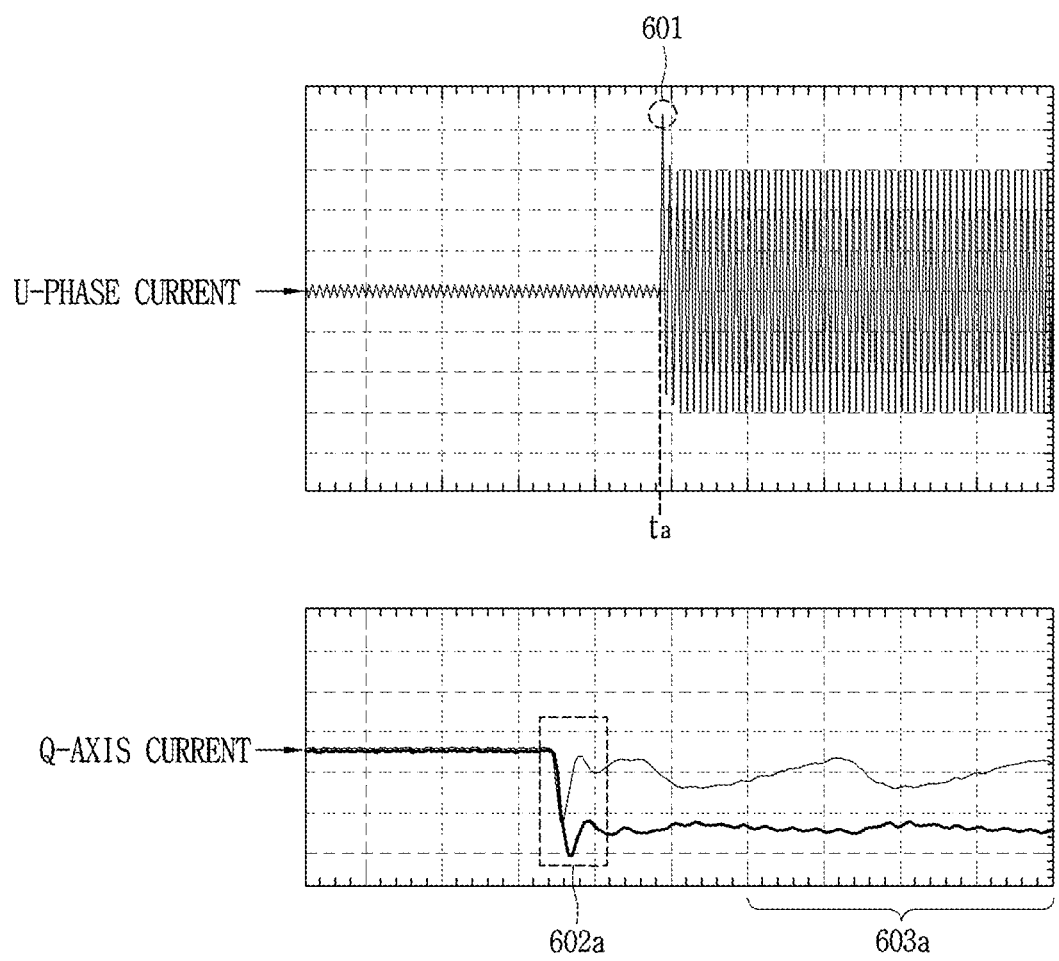
FIG. 6A is a graph showing a change in phase current of an inverter when performing a general dynamic braking on a motor.
Figure 6B:
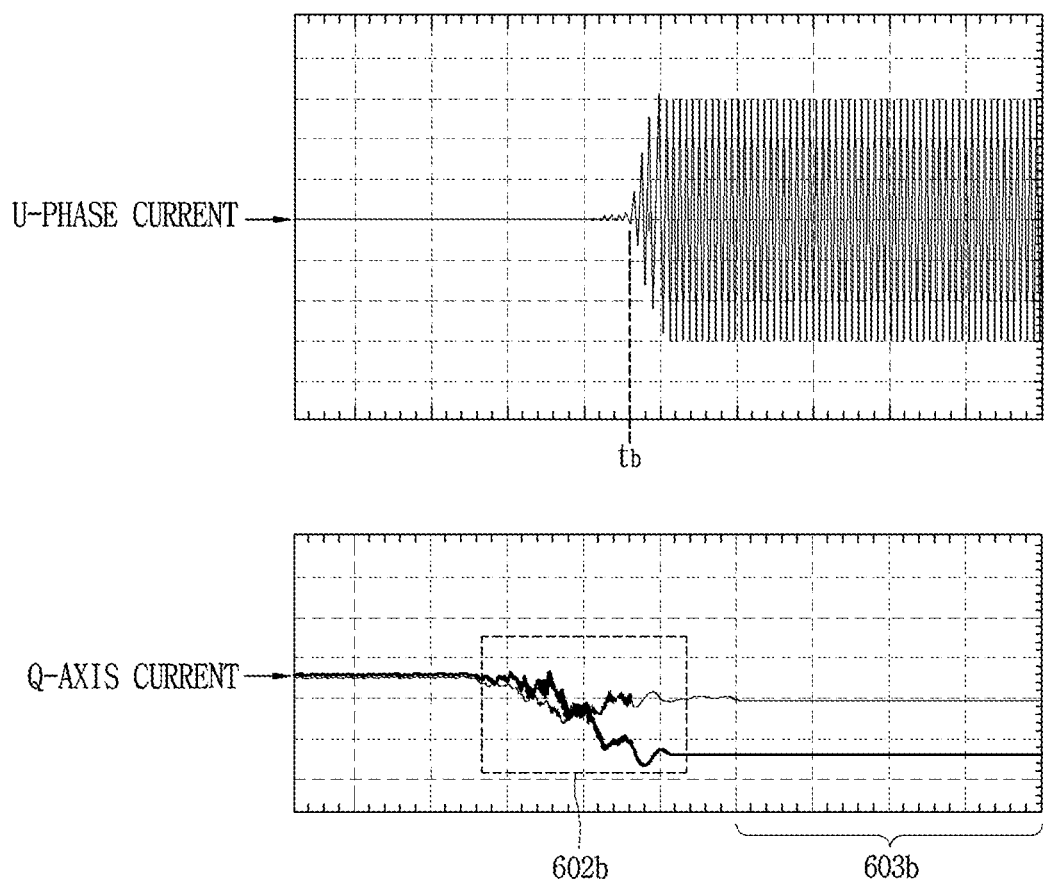
FIG. 6B is a graph showing a change in phase current of an inverter when performing a dynamic braking according to an embodiment of the present disclosure on a motor.
Figure 6C:
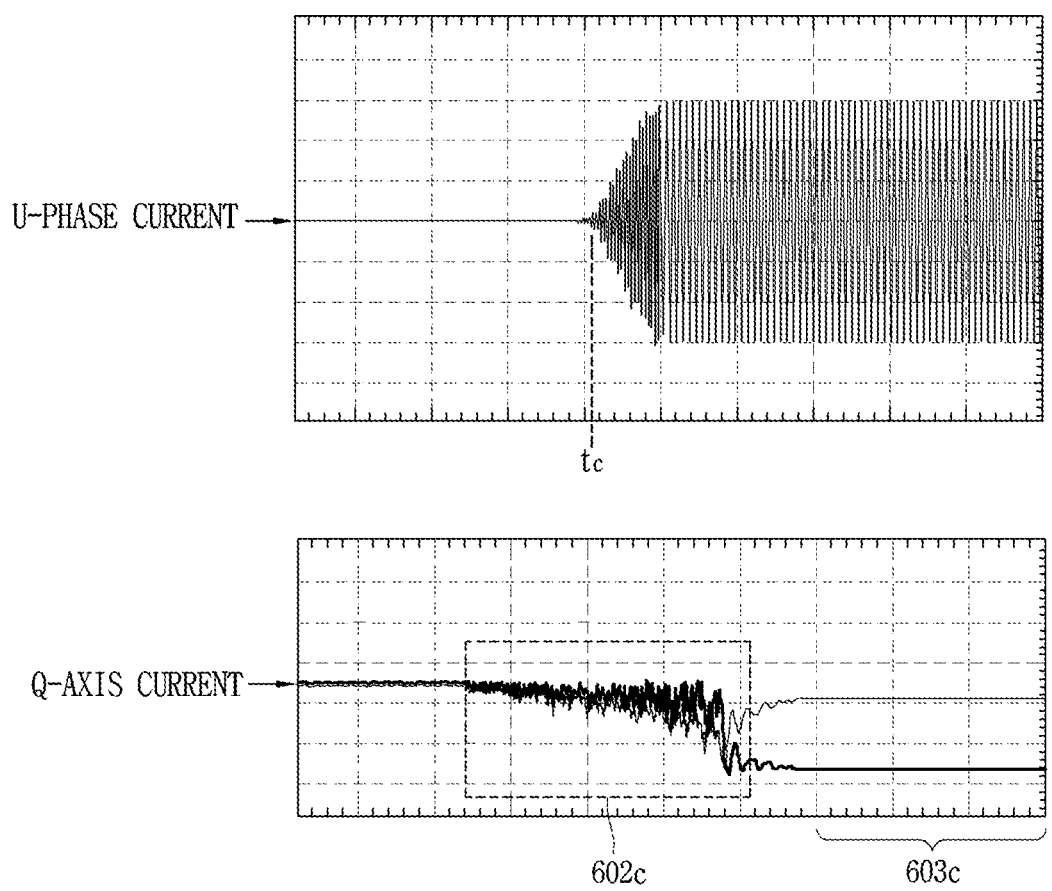
FIG. 6C is a graph showing a change in phase current of an inverter when performing a dynamic braking according to another embodiment of the present disclosure on a motor.

FIGS. 6A to 6C are graphs to compare the braking method according to the present disclosure with the related art braking method that does not perform redundant braking and intermediate braking. FIGS. 6A to 6C illustrate currents flowing in the U-phase of the three phases of the inverter unit 120 for comparison.

As illustrated in FIG. 6A, when dynamic braking of the motor is performed immediately after a control command to perform dynamic braking is generated, the bush provided in the rotor of the motor and the coupling formed to be engaged with the bush are to collide with each other. Accordingly, it can be checked that an impulse 601 is generated in the U-phase current at a time point (ta) when the dynamic braking is performed.

Further, it can be seen that a q-axis current fluctuates rapidly (602*a*) and continuously fluctuates (603*a*) even after the rapid fluctuation.

Meanwhile, FIG. 6B illustrates changes in the U-phase current when a control command to perform dynamic braking is generated, and redundant braking and intermediate braking are sequentially performed before dynamic braking is performed while the rotation speed of the motor is at 270 RPM.

That is, referring to FIG. 6B, it can be seen that the U-phase current slowly increases from a time point (tb) when a control command to perform dynamic braking is generated.

Referring to FIG. 6B, when performing redundant braking and intermediate braking before performing dynamic braking, changes in the q-axis current fluctuate relatively smoothly (602*b*) compared to the changes in the q-axis current in FIG. 6A and a value of the q-axis current stays the same (603*b*) after the fluctuation.

In addition, FIG. 6C illustrates changes in the U-phase current when a control command to perform dynamic braking is generated, and redundant braking and intermediate braking are sequentially performed before dynamic braking is performed while the rotation speed of the motor is at 600 RPM.

Similarly, it can be seen that the changes in the q-axis current in FIG. 6C are relatively smoothly fluctuated (602*c*) compared to the changes in the q-axis current in FIG. 6A, and a value of the q-axis current stays the same (603*c*) after the fluctuation.

Meanwhile, when comparing FIG. 6B with FIG. 6C, a time duration spent for the changes in the q-axis current (602*c*) in FIG. 6C to be completed is longer than a time duration spent for the changes in the q-axis current (602*b*) in FIG. 6B to be completed.

FIG. 7 illustrates one embodiment related to adjusting a time duration during which redundant braking is maintained.

For reference, the flowchart illustrated in FIG. 7 is a process that can be performed after the comparison step [S403] of FIG. 4 is performed.

As illustrated in FIG. 7, when a detected speed value is smaller than a reference speed value, the controller 180 may control a sensor (not shown) to detect a weight of an object connected to motor and to be rotated [S701].

Assuming that the motor drive apparatus is installed in a washing machine, since the washing machine includes a sensor to detect at least one of a weight of clothes introduced into the tub and a weight of washing water introduced into the tub, the controller 180 of the motor drive apparatus may receive information related to the weight detected by the sensor.

In addition, the controller 180 may set the first time interval based on the information related to the detected weight [S702]. That is, the controller 180 may set the first time interval, which is a time duration to maintain redundant braking, based on the information related to the detected weight.

Specifically, the controller 180 may increase the first time interval as the detected weight increases.

As described above, when the first time interval is set, the controller 180 may put all switches included in the inverter unit 120 into full-off state during the set first time interval [S703].

When the first time interval elapses, the controller 180 may control the inverter such that the magnitude of the phase current flowing through the bottom switches gradually increases up to a reference value [S704].

As the phase current reaches the reference value, the controller 180 may put the bottom switches into full-on state [S705].

Figure 8:
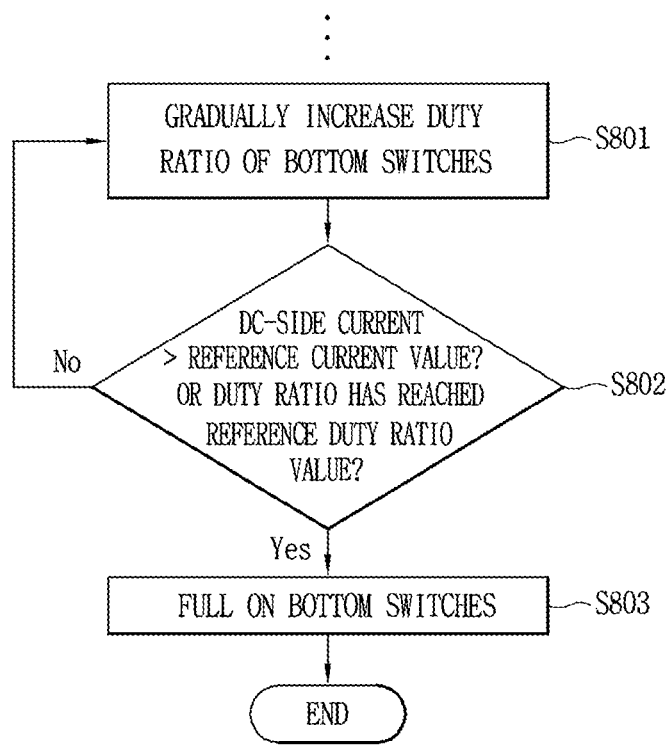
FIG. 8 is a flowchart illustrating a control method for a motor drive apparatus in accordance with still another embodiment of the present disclosure.

FIG. 8 illustrates a protection process to secure a safety of the motor drive apparatus in the process of gradually increasing the duty ratio.

For reference, the flowchart shown in FIG. 8 is a process which can be performed after the step of putting all switches of the inverter unit 120 into full-off state in FIG. 4 [S405] or the step of putting all switches of the inverter unit 120 into full-off state during the set first time interval in FIG. 7 [S703] is performed.

As shown in FIG. 8, when a redundant braking to put all the switches of the inverter unit 120 into full-off state is completed, the controller 180 may gradually increase the duty ratio of the bottom switches S4, S5, and S6 of the inverter unit 120 [S801].

Thereafter, the controller 180 may compare a DC-side current flowing through the DC link capacitor with a limit current value, or compare the duty ratio of the bottom switches with the reference duty ratio value [S802].

Specifically, when the duty ratio of the bottom switches of the inverter unit 120 starts to increase, the controller 180 may detect the DC-side current flowing through the DC link capacitor. Here, the controller 180 may detect the DC-side current flowing through the DC link capacitor by using the shunt resistor Rs included in the motor drive apparatus.

In one embodiment, the limit current value may be set based on qualification of the controller 180. For example, the qualification may include information related to the capacity of the DC link capacitor and a limit temperature of the controller 180. That is, the reference current value may be set within a range capable of ensuring the safety of the controller 180.

Meanwhile, although not illustrated in FIG. 8, the controller 180 may detect DC-side voltage applied to both ends of the DC link capacitor. That is, the motor drive apparatus may include a separate voltage detection unit (not shown) to detect the DC-side voltage applied to both ends of the DC link capacitor. In addition, the controller 180 may detect a current flowing through the DC link capacitor by using the shunt resistor, and detect the DC-side voltage by using the detected current. When the DC-side voltage is detected, the controller 180 may compare the detected DC-side voltage with a limit voltage value.

For example, the limit voltage value can be set to 400 V.

When the detected DC-side current exceeds the limit current value, or when the duty ratio of the bottom switches reaches the reference duty ratio value, the controller 180 may control the inverter unit 120 so that the bottom switches S4, S5, and S6 are put into full-on state [S803].

Specifically, the controller 180 may put the bottom switches into full-on state by increasing the duty ratio of the bottom switches up to a maximum value when the DC-side current exceeds the reference current value even if the duty ratio does not reach the reference duty ratio value after the duty ratio of the bottom switches starts to gradually increase.

That is, unlike entering the dynamic braking steps [S407, S705] of putting the bottom switches into full-on state after the intermediate braking steps [S406, S704] of gradually increasing the duty ratio of the bottom switches is completed in the embodiments illustrated in FIGS. 4 and 7, the controller 180 according to the embodiment illustrated in FIG. 8 may put the bottom switches into full-on state so as to enter the dynamic braking step [S803] when the DC-side current exceeds the reference current value even though the intermediate braking step [S801] is not completed.

As such, the controller 180 of the motor drive apparatus according to the present disclosure can prevent overcurrent from flowing into the DC link capacitor by performing the step [S802] of comparing the DC-side current with the reference current value.

Figure 9:
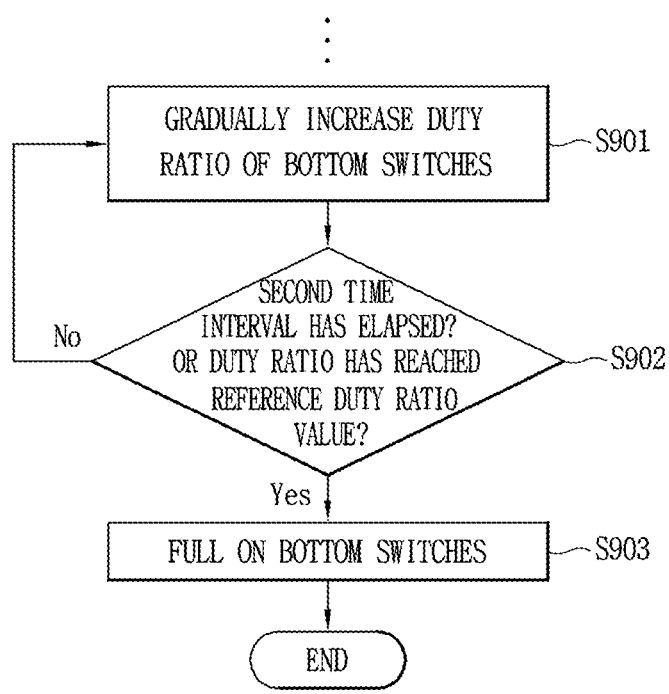
FIG. 9 is a flowchart illustrating a control method for a motor drive apparatus in accordance with still another embodiment of the present disclosure.

FIG. 9 illustrates a protection process to secure a safety of the motor drive apparatus in the process of gradually increasing the duty ratio.

For reference, the flowchart shown in FIG. 9 is a process which can be performed after the step of putting all switches of the inverter unit 120 into full-off state in FIG. 4 [S405] or the step of putting all switches of the inverter unit 120 into full-off state during the set first time interval in FIG. 7 [S703] is performed.

As shown in FIG. 9, when the redundant braking to put all the switches of the inverter unit 120 into full-off state is completed, the controller 180 may gradually increase the duty ratio of the bottom switches S4, S5, and S6 of the inverter unit 120 [S901].

Thereafter, the controller 180 may determine whether a second time interval has elapsed since the duty ratio of the bottom switches gradually started to increase, or may compare the duty ratio of the bottom switches with the reference duty ratio value [S902].

Specifically, when the duty ratio of the bottom switches of the inverter unit 120 starts to increase, the controller 180, by operating a timer, may periodically detect information related to the time that has elapsed since when the duty ratio of the bottom switches started to increase. Here, a cycle to detect information related to the elapsed time may correspond to a unit time of the timer or may be set shorter than the unit time.

In one embodiment, the second time interval may be set by the qualification of the controller 180. That is, the second time interval may be set within a range capable of ensuring the safety of the controller 180.

When the second time interval has elapsed since when the duty ratio of the bottom switches started to gradually increase, or when the duty ratio of the bottom switches reaches the reference duty ratio value, the controller 180 may control the inverter unit 120 so that the bottom switches S4, S5, and S6 are put into full-on state [S903].

Specifically, even if the duty ratio does not reach the reference duty ratio value, the controller 180 may put the bottom switches into full-on state by increasing the duty ratio of the bottom switches up to a maximum value when the second time interval has elapsed since when the duty ratio of the bottom switches gradually started to increase.

That is, unlike entering the dynamic braking steps [S407, S705] of putting the bottom switches into full-on state after the intermediate braking steps [S406, S704] of gradually increasing the duty ratio of the bottom switches is completed in the embodiments illustrated in FIGS. 4 and 7, the controller 180 according to the embodiment illustrated in FIG. 8 may put the bottom switches into full-on state so as to enter the dynamic braking step [S903] when the second time interval has elapsed since when the intermediate braking step [S901] started to be performed even though the intermediate braking step [S901] is not completed.

As such, the controller 180 of the motor drive apparatus according to the present disclosure can prevent overcurrent from flowing into the DC link capacitor by limiting a time duration of performing the intermediate braking step [S901].

Meanwhile, the controller 180 may determine [S902] whether the time duration of performing the intermediate braking step [S901] has elapsed the second time interval, and also may determine [S802] whether the DC-side current exceeds the reference current value.

That is, the controller 180 may enter the dynamic braking step when the detected DC-side current exceeds the reference current value, or the time duration of performing the intermediate braking step [S901] exceeds the second time interval, or the duty ratio of the bottom switches reaches the reference duty ratio value.

In the process of performing the intermediate braking step as described above, a plurality of protection algorithms may be simultaneously applied to prevent the DC-side current from excessively increasing due to a counter electromotive force generated when the bottom switches are in ON state.

When the plurality of protection algorithms is applied, an operation safety in the motor drive apparatus can be secured even if an error is included in the current value detected through the shunt resistor or an operation error of the timer occurs.

Figure 10:
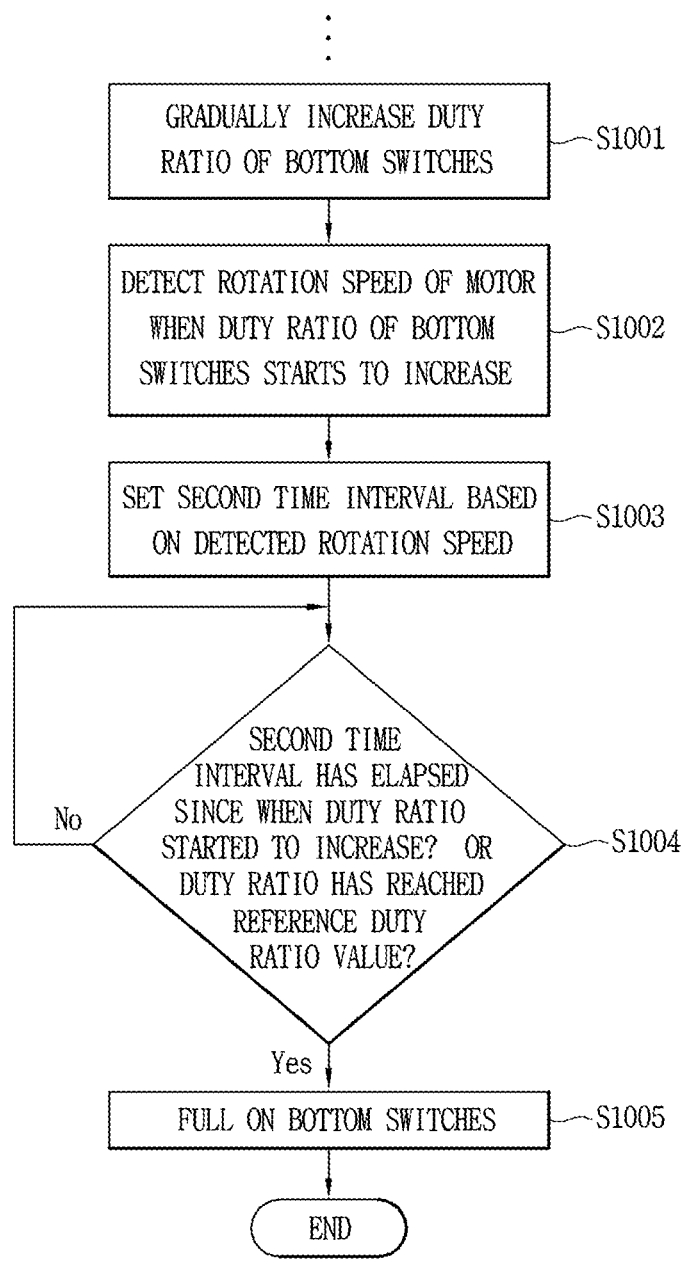
FIG. 10 is a flowchart illustrating a control method for a motor drive apparatus in accordance with still another embodiment of the present disclosure.

In FIG. 10, one embodiment related to the intermediate braking method of gradually increasing the duty ratio is shown.

For reference, the flowchart shown in FIG. 10 is a process which can be performed after the step of putting all switches of the inverter unit 120 into full-off state in FIG. 4 [S405] or the step of putting all switches of the inverter unit 120 into full-off state during the set first time interval in FIG. 7 [S703] is performed.

In addition, it is obvious that at least one of the protection algorithms of FIGS. 8 and 9 may be additionally applied to the embodiment shown in FIG. 10.

As shown in FIG. 10, when the redundant braking to put all the switches of the inverter unit 120 into full-off state is completed, the controller 180 may gradually increase the duty ratio of the bottom switches S4, S5, and S6 of the inverter unit 120 [S1001].

Thereafter, the controller 180 may detect the rotation speed of the motor at a time when the duty ratio of the bottom switches starts to gradually increase [S1002]. For a brushless DC (BLDC) motor, a method in which the controller 180 detects the rotation speed of the motor is a known technique, and thus, the description thereof is omitted in this description.

In addition, the controller 180 may set the second time interval based on the detected rotation speed [S1003].

The controller 180 may determine whether the set second time interval has elapsed since when the duty ratio of the bottom switches gradually started to increase, or may compare the duty ratio of the bottom switches with the reference duty ratio value [S1004].

Specifically, when the duty ratio of the bottom switches of the inverter unit 120 starts to increase, the controller 180, by operating a timer, may periodically detect information related to the time that has elapsed since when the duty ratio of the bottom switches started to increase. Here, a cycle to detect information related to the elapsed time may correspond to a unit time of the timer or may be set shorter than the unit time.

When the second time interval has elapsed since when the duty ratio of the bottom switches started to gradually increase, or when the duty ratio of the bottom switches reaches the reference duty ratio value, the controller 180 may control the inverter unit 120 so that the bottom switches S4, S5, and S6 are put into full-on state [S1005].

In one embodiment, the controller 180 may set the second time interval shorter as the rotation speed of the motor at a time when the duty ratio of the bottom switches starts to increase is greater.

That is, the second time interval may decrease as the rotation speed of the motor at the time when the duty ratio of the bottom switches starts to increase increases.

Figure 11:
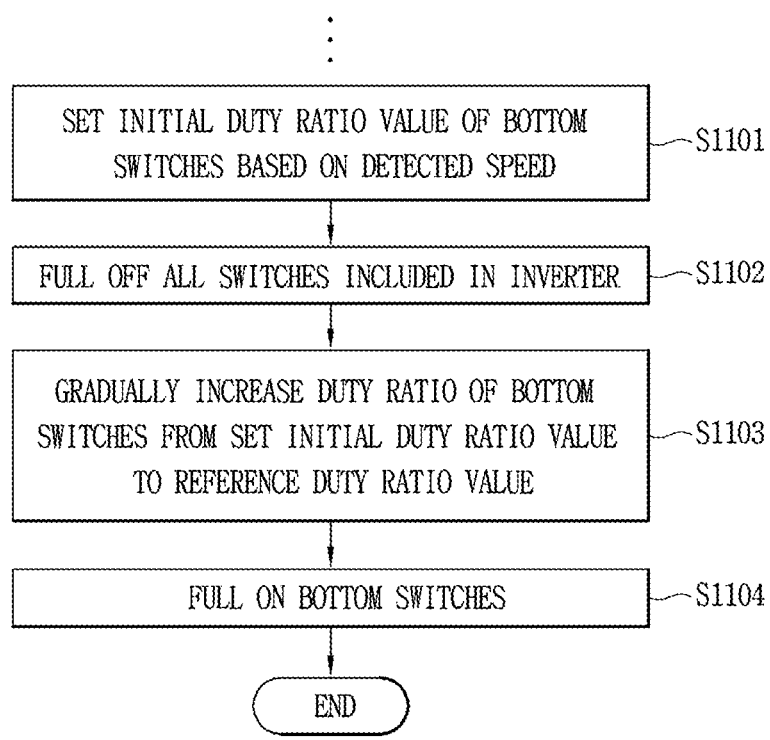
FIG. 11 is a flowchart illustrating a control method for a motor drive apparatus in accordance with still another embodiment of the present disclosure.

In FIG. 11, one embodiment related to the intermediate braking method of gradually increasing the duty ratio is shown.

For reference, the flowchart shown in FIG. 11 is a process that can be performed after the step [S1002] of detecting the rotation speed of the motor at the time when the duty ratio of the bottom switches of FIG. 10 starts to gradually increase is completed.

In addition, it is obvious that at least one of the protection algorithms of FIGS. 8 and 9 and the algorithm of FIG. 10 may be additionally applied to the embodiment shown in FIG. 11.

As shown in FIG. 11, the controller 180 may set an initial duty ratio value of the bottom switches based on the rotation speed of the motor detected when a control command to perform dynamic braking is generated [S1101].

Specifically, in the process of gradually increasing the duty ratio of the bottom switches, the controller 180 may gradually increase the duty ratio of the switches each time one cycle of the switches elapses. Here, the controller 180 may set a duty ratio value for a first cycle in which the duty ratio of the bottom switches is increased, based on the detected speed.

For example, when the detected speed is 270 RPM, the initial duty ratio value may be set to 50%.

Thereafter, the controller 180 may control the inverter unit 120 such that the duty ratio of the bottom switches S4, S5, and S6 is gradually increased from the set initial duty ratio value to the reference duty ratio value [S1103].

For example, when the detected speed is 100 RPM, the initial duty ratio value may be set to 20%.

Although not shown in FIG. 11, the controller 180 may set an increment of the duty ratio according to the set initial duty ratio value.

For example, the controller 180 may set the increment by dividing the difference between the set initial duty ratio value and the maximum value of the duty ratio by a predetermined number of times. As such, when the increment is set, a time duration spent for gradually increasing the duty ratio is maintained, even if the initial duty ratio value is changed.

In another example, the controller 180 may increase the increment as the set initial duty ratio value increases. As such, when the increment is set, the time duration spent for gradually increasing the duty ratio is decreased as the set initial duty ratio value increases.

Figure 12:
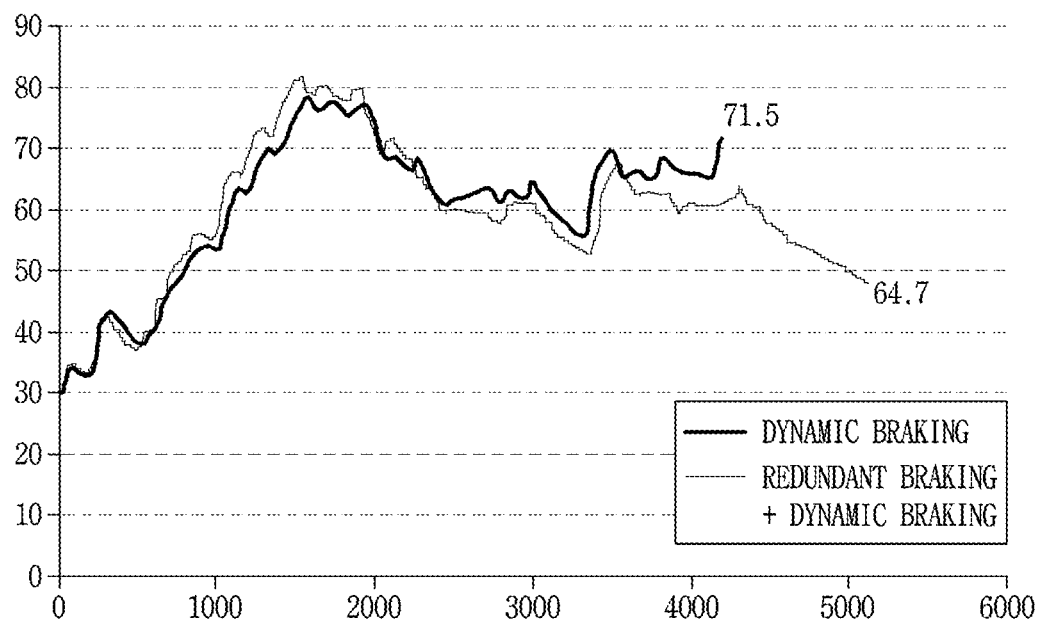
FIG. 12 is a graph showing a change in temperature of a controller of a motor drive apparatus when a control method for the motor drive apparatus in accordance with the present disclosure is applied.

FIG. 12 is a graph showing a change in temperature of an intelligent power module (IPM) included in the controller 180 when a control method for the motor drive apparatus in accordance with the present disclosure is applied.

As shown in FIG. 12, a temperature of the IPM performing the dynamic braking method according to the present disclosure is lower than a temperature of the IPM performing the related art dynamic braking method.

The motor drive apparatus according to the present disclosure can minimize a noise that may be generated between components directly or indirectly connected to the motor by gradually increasing the phase current of the inverter connected to the motor when performing dynamic braking on the motor.

In addition, the motor drive apparatus according to the present disclosure can minimize a collision force between components directly or indirectly connected to the motor by gradually increasing a duty ratio of the inverter when performing dynamic braking on the motor.

Further, according to the motor drive apparatus of the present disclosure, safety of the apparatus having the motor can be secured by limiting the magnitude of the current flowing in the DC-side capacitor connected to the inverter while minimizing noise that may be generated between components directly or indirectly connected to the motor, when dynamic braking of the motor is performed.

In addition, according to the motor drive apparatus of the present disclosure, a failure of the components directly or indirectly connected to the motor can be prevented by minimizing a collision force between the components directly or indirectly connected to the motor, when dynamic braking of the motor is performed.

In addition, according to the motor drive apparatus of the present disclosure, by gradually increasing the phase current of the inverter when dynamic braking of the motor is performed, generation of an impulse on the phase current can be prevented and a braking of the motor can be more stably performed.

The invention claimed is:

1. A motor drive apparatus comprising:
a direct current (DC)-side capacitor configured to be charged with direct current power;
an inverter that comprises a plurality of top switches and a plurality of bottom switches, that is configured to perform a switching operation to convert power stored in the DC-side capacitor into alternating current power, and that is configured to output the alternating current power to a motor;
a shunt resistor configured to detect a current flowing through the DC-side capacitor; and
a controller configured to control the inverter to perform a dynamic braking operation for stopping the motor,
wherein the controller is configured to, before performing the dynamic braking operation, control the inverter to increase a phase current flowing through the bottom switches.

2. The motor drive apparatus of claim 1, wherein the controller is further configured to control the inverter to increase a duty ratio of the bottom switches.

3. The motor drive apparatus of claim 2, wherein the controller is further configured to control the inverter to increase the duty ratio linearly with respect to time.

4. The motor drive apparatus of claim 2, wherein the controller is further configured to control the inverter to decrease an increment of the duty ratio while increasing the duty ratio.

5. The motor drive apparatus of claim 1, wherein the controller is further configured to control the inverter to increase the phase current in a state in which the bottom switches are switched from a full-off state into a full-on state.

6. The motor drive apparatus of claim 1, wherein the controller is further configured to turn off all of the top switches and the bottom switches for a first time interval from a time point when a control command for performing the dynamic braking operation is generated.

7. The motor drive apparatus of claim 6, wherein the controller is further configured to, based on an elapse of the first time interval, control the inverter to increase a magnitude of the phase current to a reference value.

8. The motor drive apparatus of claim 7, wherein the controller is further configured to, based on an elapse of a second time interval from a time point at which the duty ratio starts to increase, control the inverter to perform the dynamic braking operation while maintaining the bottom switches in a full-on state.

9. The motor drive apparatus of claim 8, wherein the controller is further configured to:

detect information related to a rotation speed of the motor at a time point when a magnitude of the phase current starts to increase; and
set the second time interval based on the information related to the rotation speed.

10. The motor drive apparatus of claim 7, wherein the controller is further configured to, based on the magnitude of the phase current being equal to the reference value, control the inverter to perform the dynamic braking operation while maintaining the bottom switches in a full-on state.

11. The motor drive apparatus of claim 7, wherein the controller is further configured to, based on a current value detected by the shunt resistor exceeding a limit current value, control the inverter to perform the dynamic braking operation while maintaining the bottom switches in a full-on state.

12. The motor drive apparatus of claim 7, wherein the controller is further configured to set an initial duty ratio value of the bottom switches based on a rotation speed of the motor at a time point when a control command for performing the dynamic braking operation is generated.

13. The motor drive apparatus of claim 12, wherein the controller is further configured to, before performing the dynamic braking operation, control the inverter to increase the duty ratio from the initial duty ratio value to a reference duty ratio value.

14. The motor drive apparatus of claim 12, wherein the controller is further configured to, before performing the dynamic braking operation, control the inverter to increase the duty ratio from the initial duty ratio value by a predetermined increment in each operation cycle of the bottom switches.

15. The motor drive apparatus of claim 14, wherein the controller is further configured to control the inverter to increase the duty ratio from the initial duty ratio value until the phase current becomes a reference current value.

16. The motor drive apparatus of claim 12, wherein the controller is further configured to, before performing the dynamic braking operation, control the inverter to increase the duty ratio from the initial duty ratio value in each operation cycle of the bottom switches and to decrease an increment of the duty ratio.

17. The motor drive apparatus of claim 12, wherein the controller is further configured to decrease the initial duty ratio value based on an increase of the rotation speed of the motor at a time point when a control command for performing the dynamic braking operation is generated.

18. The motor drive apparatus of claim 6, further comprising a sensor configured to detect a weight of an object that is connected to the motor and configured to be rotated by the motor,
wherein the controller is configured to set the first time interval based on the weight of the object detected by the sensor.

19. The motor drive apparatus of claim 1, wherein the controller is further configured to, based on a control command for performing the dynamic braking operation being generated while a rotation speed of the motor is less than or equal to a reference speed value, control the inverter to increase the phase current before performing the dynamic braking operation.

20. The motor drive apparatus of claim 19, wherein the controller is further configured to, based on the control command for performing the dynamic braking operation being generated while the rotation speed of the motor is greater than the reference speed value, control the inverter to switch the bottom switches to a full-off state.

\* \* \* \* \*